United States Patent [19]

Nakamura

[11] Patent Number: 5,012,772
[45] Date of Patent: May 7, 1991

[54] INTERNAL COMBUSTION ENGINE

[75] Inventor: Akira Nakamura, Muroto, Japan

[73] Assignee: Sankoshoki Corporation, Murato, Japan

[21] Appl. No.: 501,365

[22] Filed: Mar. 27, 1990

Related U.S. Application Data

[63] Continuation of Ser. No. 235,390, Aug. 24, 1988, abandoned.

[30] Foreign Application Priority Data

Jun. 17, 1988 [JP] Japan .................................. 63-150521

[51] Int. Cl.$^5$ .............................................. F02B 47/00
[52] U.S. Cl. .................................... 123/25 C; 123/250
[58] Field of Search .................. 123/25 C, 25 D, 25 B

[56] References Cited

U.S. PATENT DOCUMENTS

| 3,074,228 | 1/1963 | Lee | 123/25 C |
|---|---|---|---|
| 3,608,529 | 9/1971 | Smith et al. | 123/25 C |
| 4,120,268 | 10/1978 | Bastenhof | 123/25 C |
| 4,417,447 | 11/1983 | Thomas | 123/25 C |
| 4,548,187 | 10/1985 | Olsson et al. | 123/25 C |

FOREIGN PATENT DOCUMENTS

| 731549 | 6/1975 | Netherlands | 123/25 C |
|---|---|---|---|
| 2059501 | 4/1981 | United Kingdom | 123/25 D |

Primary Examiner—E. Rollins Cross
Attorney, Agent, or Firm—McAulay Fisher Nissen Goldberg & Kiel

[57] ABSTRACT

Internal combustion engines to increase the engine output without altering the cylinder capacity, and comprising liquid injection valves (26, 46) by which fixed quantities of prescribed liquids are injected into combustion chambers (14a, 14b), timed to the detonation process in the internal combustion engine, and heating means by which the liquids injected from the liquid injection valves (26, 46) are heated beforehand to a predetermined high temperature by utilizing the intense heat generating around and nearby said combustion chambers (14a, 14b), so that the device enables effective utilization of heat energy generating around and nearby cylinders as well as increasing the engine output by the sudden expansion of the liquid injected into the combustion chamber pressing the piston therein with a powerful downward stroke.

13 Claims, 6 Drawing Sheets

INTERNAL COMBUSTION ENGINE

This application is a continuation of application Ser. No. 07/235,390, filed Aug. 24, 1988, now abandoned.

BACKGROUND OF THE INVENTION (1) Field of the Invention

The present invention relates to an internal combustion engine wherein fuel gas expansion in a combustion chamber initiates a reciprocating motion of a piston therein; more specifically, to the structure of an internal combustion engine capable of providing higher engine power.

(2) Description of the Prior Art

Conventionally, a cooling system is essential to an internal combustion engine which becomes heated to an extremely high temperature by the hot combustion gas during operation, and up to now, for prevention of said combustion gas overheating the cylinder body, the technique of injecting water forcibly into the cylinder body had been a well known art.

However, the injection of water forcibly into the abovementioned cylinder body only has a cooling effect thereof and does not function in any other way.

Therefore, the heat generating in the internal combustion engine during various stages of mechanical processes, are either absorbed in the cooling water or are expelled outside and wasted. Also, same could be said of the heat energy contained in the exhaust gas discharged after detonation and combustion.

On the other hand, power up of internal combustion engines had been a subject of years' research, but increasing the engine output by altering the cylinder capacity had not been an easy task.

SUMMARY OF THE INVENTION

It is therefore the object of the present invention to utilize effectively the heat generating around cylinders for cooling water, exhaust gases or the like.

Another object of the present invention is to increase the output of the internal combustion engine.

To accomplish these objects the present invention comprises liquid jetting valves (26, 46) by which fixed quantities of prescribed liquids are jetted into combustion chambers (14a, 14b) timed to the detonation process of the internal combustion engine, and a heating means by which said liquids injected from abovementioned liquid injection valves (26, 46) are heated beforehand to a predetermined high temperature utilizing the intense heat generating around and nearby said combustion chambers (14a, 14b).

BRIEF DESCRIPTION OF THE DRAWINGS

FIG. 6 (B) is a sectional view taken along the line B—B in FIG. 6 (A).

FIG. 7 (B) is a sectional view taken along the lines B—B in FIG. 7 (A).

DETAILED DESCRIPTION OF THE PREFERRED EMBODIMENT

Following are the detailed explanations of the preferred embodiments of the present invention with cross reference to the attached drawings made as necessary.

Figure 1:
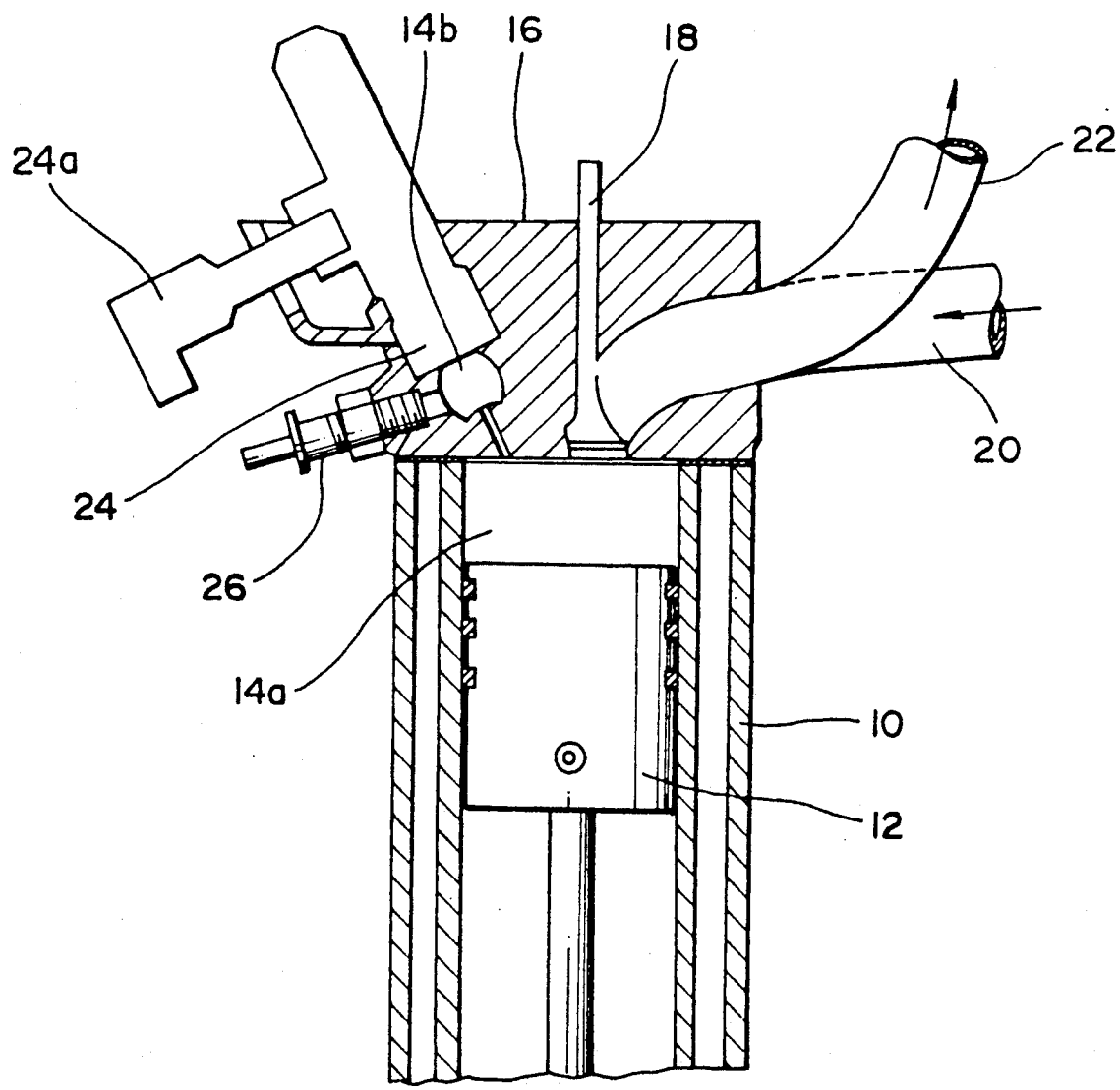
FIG. 1 is a sectional view of the principal engine parts of one embodiment of the internal combustion engine according to the present invention.
Figure 2:
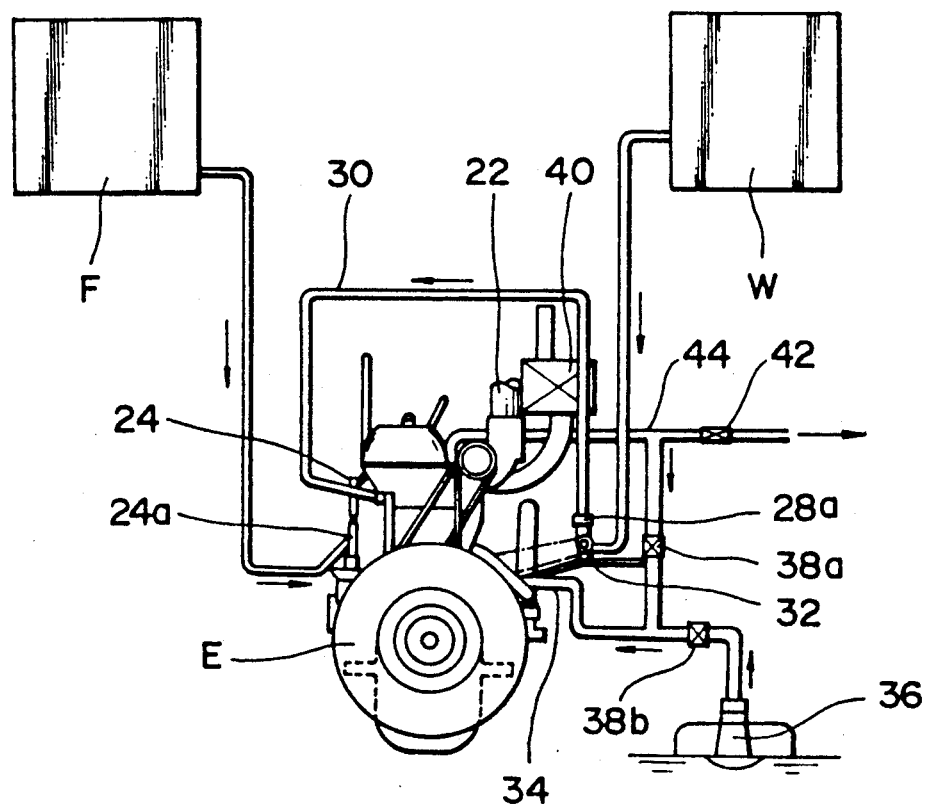
FIG. 2 is a schematic view of the internal combustion engine drive system in application of the present invention.

In FIG. 1, there is shown a sectional view of the principal part of the internal combustion engine according to the present invention. FIG. 2 shows the application of the present invention in the schematic view of the drive system in the internal combustion engine. The internal combustion engine of a ship is used in the explanation of the present invention.

In FIGS. 1 and 2 (some of the reference numerals are in FIG. 1 and others are in FIG. 2), 10 denotes the cylinder body, 12 denotes the piston, 14a denotes the proper combustion chamber, 14b denotes the precombustion chamber wherein, as is well known, the fuel is injected and a part of said fuel blown with high velocity into the proper combustion chamber 14a through the connecting port by the high combustion heat and the pressure differential.

16 denotes the cylinder head, 18 denotes the air intake/exhaust valve alternating intakes and outlets, 20 denotes the intake manifold, 22 denotes exhaust manifold, 24 denotes the fuel injection valve, 24a denotes the fuel pump, 26 denotes the hot-water injection valve mounted onto the outer side of the cylinder head 16, F denotes the fuel tank, W denotes the water tank, 28a denotes the water jetting pump, 30 denotes water jetting pump's connection pipe, 32 denotes the chain gear for the water jetting pump time-driven by the engine's camshaft not shown in FIGS. 1 or 2.

34 denotes the cooling water pump for the engine, 36 denotes the sea water suction valve sucking in the sea water used as the coolant for the engine, 38a, 38b denote the check valves, 40 denotes the air conditioner, 42 denotes the thermostatically operated automatic switch opening and closing automatically depending on the temperature of the cooling water, 44 denotes the connecting pipe for the cooling water, E denotes a schematic view of the engine body seen from the flywheel side; all foregoing parts and piping systems connected to said engine body E.

In the embodiment of such structured internal combustion engine, when the fuel, injected into the precombustion chamber 14b by fuel injection valve 24, ignites and detonates in the cylinder body 10 in compression process, the water injection valve 26 injects water into said precombustion chamber 14b at a prearranged optimum timing linked to the camshaft of engine E.

The water injected into precombustion chamber 14b flows from water tank W passing through water injection valve 28a, water injection pump's connecting pipe 30 terminating in water injection valve 26 while being heated to a high temperature by appropriate means during the flow. In the illustrated examples, the cooling water sucked in by the sea water suction valve 36 passes through check valve 38b into cylinder head 16, wherein heat transfer takes place, then passing through the cooling water connecting pipe 44 is released thereoutside by the automatic switch 42, but the water, heated sufficiently to a high temperature by the thermostat inserted therein, is returned to the cylinder head 16 passing through the check valve 38a. By this operation, the water contained in the water injection valve 26, mounted to outer side of cylinder head 16, can be maintained at a high temperature.

It is therefore possible to maintain the temperature of the water jetted from said water injection valve 26 at 70° to 80° or above.

As noted above, the injection of the hot-water into the precombustion chamber 14b being timed to the completion of the ignition and detonation process of the fuel gas inside the cylinder body 10, said hot-water vaporizes instantaneously therein and pushed into the cylinder body 10 (proper combustion chamber 14a) as a high pressure gas pressing the piston with downward stroke and released thereafter through the exhaust manifold 22.

Thus, in the embodiment of the present invention, repetition of ignition and detonation of the fuel gas and injection of hot-water operations causes vaporization of said hot-water creating a powerful expansion force which fuctions to make the power up of the internal combustion engine possible.

Next, referring to FIGS. 3 to 7, explanations will be given on other embodiments of the present invention. FIG. 4 shows the view from above of the principal parts of the internal combustion engine in the present invention.

Figure 3:
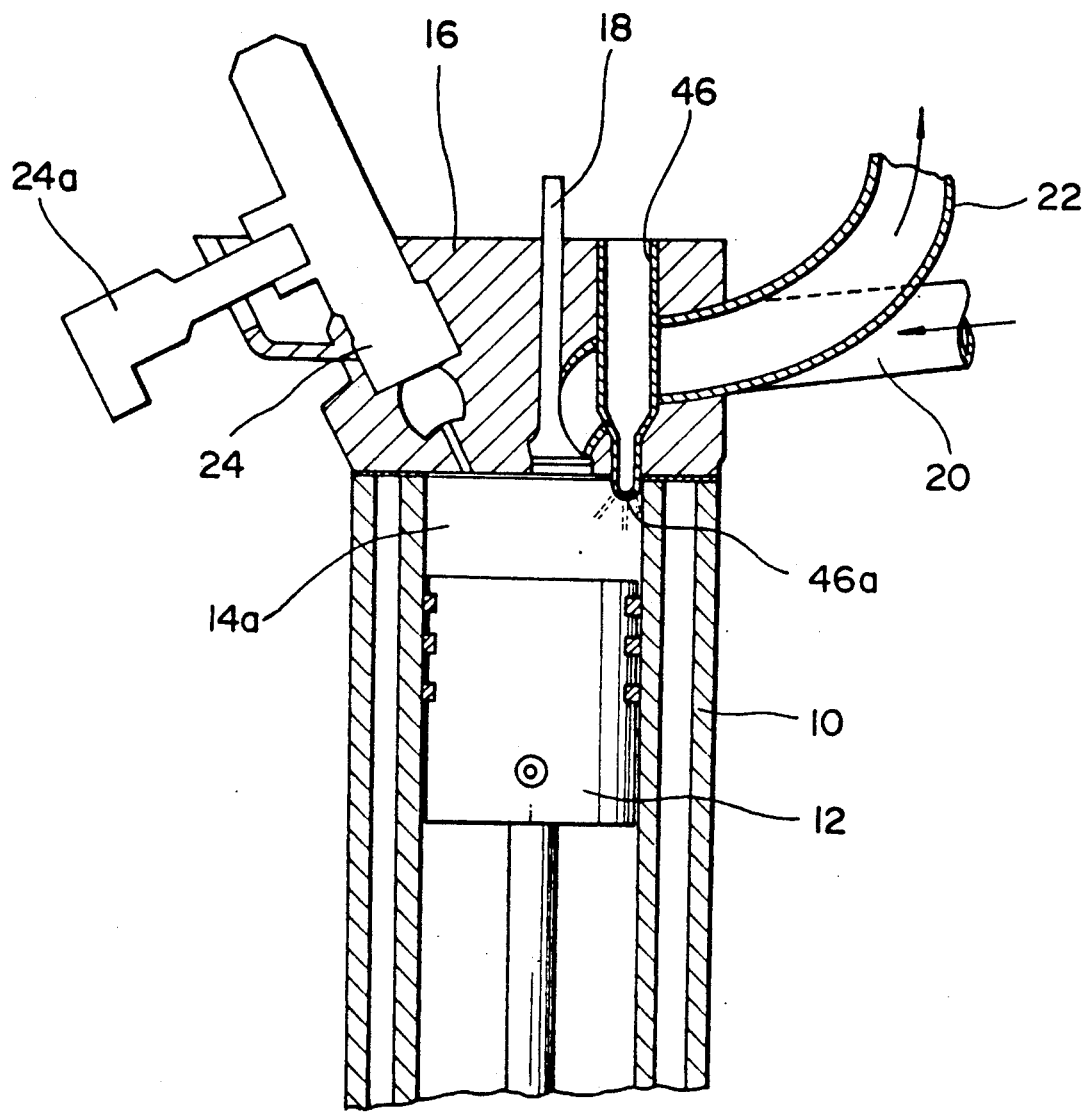
FIG. 3 is a sectional view of the principal engine parts of another embodiment of the internal combustion engine according to the present invention.
Figure 4:
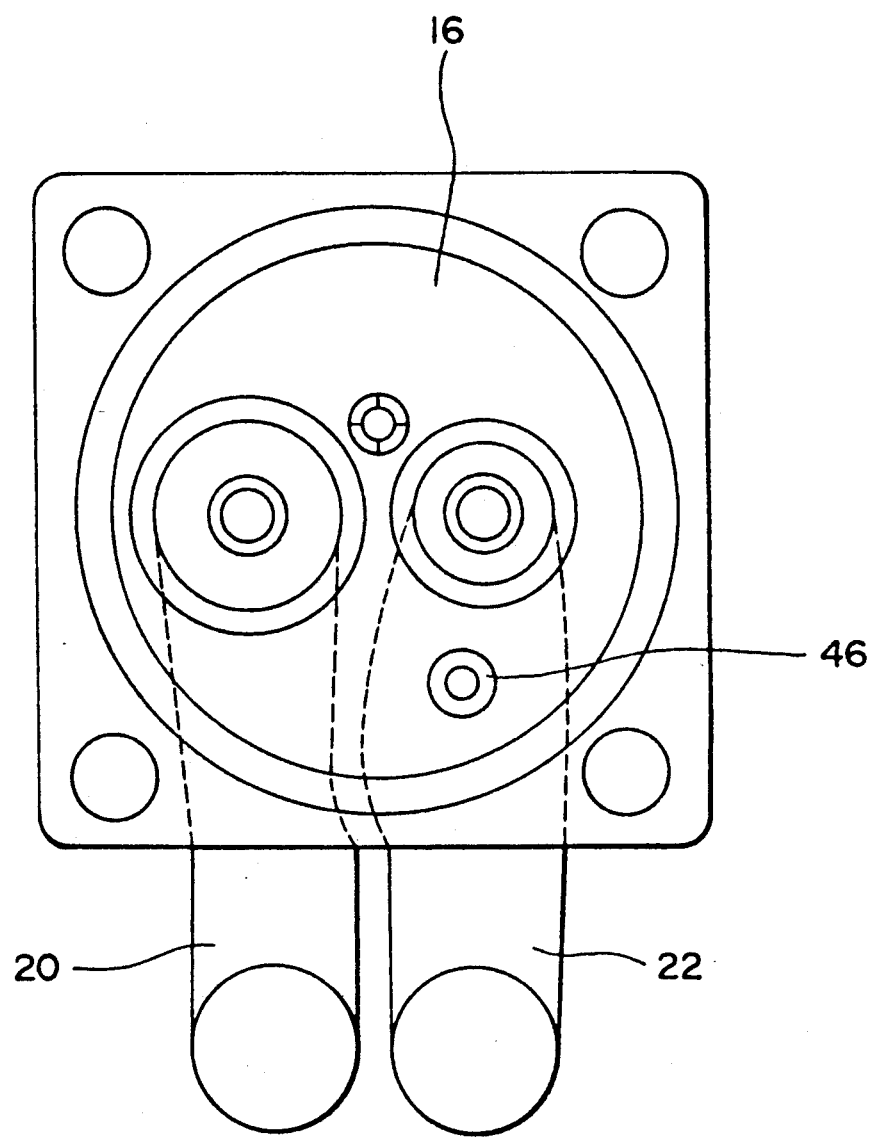
FIG. 4 is a plan view of the principal parts in FIG. 3.

FIG. 3 corresponds to FIG. 1, for which prior explanation had been made, and since parts or locations represented by same numerals are identical, explanations will be omitted for such, however, for numerals not shown in FIG. 1 detailed explanation will be provided. Also same can be said of aforesaid FIG. 2 in the embodiments to be explained hereafter, and cross-reference shall be made to it as necessary.

In the FIGS. 3 to 7, 46 denotes a hot-water injection valve fixed inside the exhaust manifold 22. As indicated in FIG. 4, said hot-water injection valve 46 is inserted from the top of the cylinder head 16, right above and through the exhaust manifold 22, the tip of said hot-water injection valve formed into a nozzle 46a, said nozzle 46a sticking into the cylinder body 10, through said nozzle 46a the water, heated by the high temperature exhaust gas passing through the exhaust manifold 22, is jetted into cylinder body 10 by the actuation of aforementioned water injection pump 28a.

Figure 5:
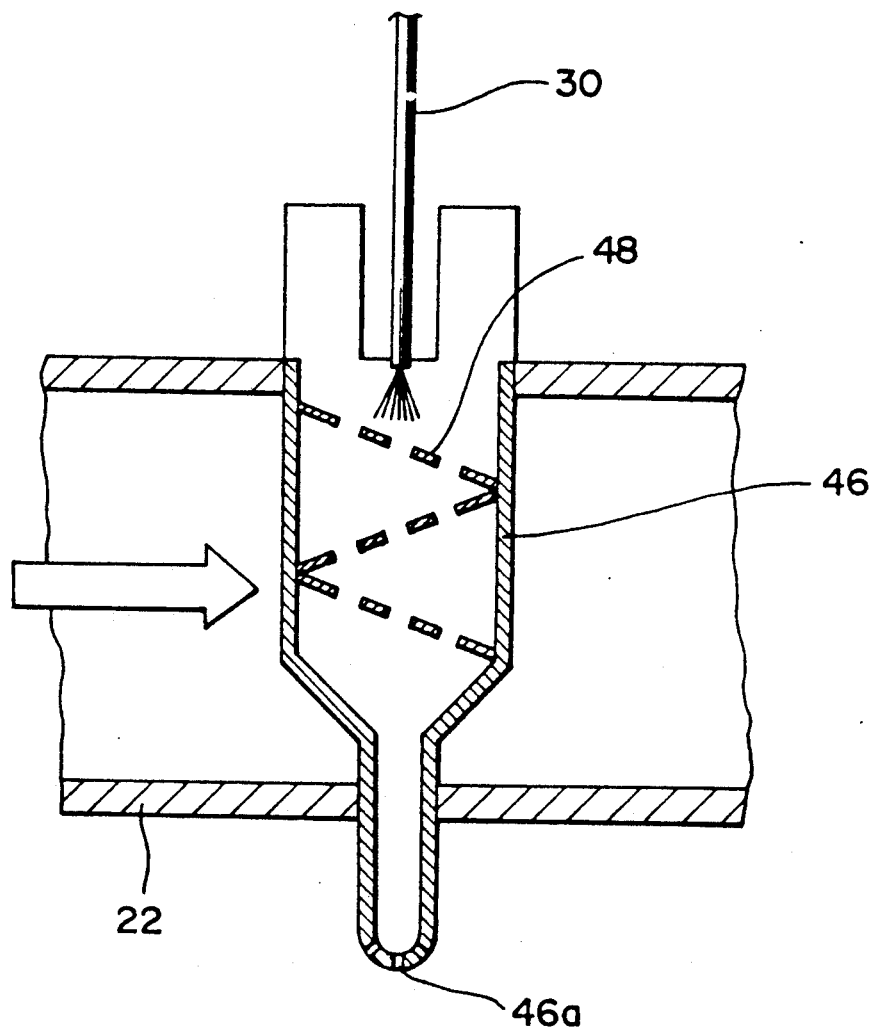
FIG. 5 is a sectional view of principal engine parts of the internal combustion engine according to the present invention.

FIG. 5 shows an example of aforementioned hot-water injection valve 46, particularly an example of a valve having spiral endothermic fin 48 fixed onto inside walls thereof, said endothermic fin 48 absorbing the heat passing through the exhaust manifold 22, increasing the heating efficiency to the water passing through the water jetting pump connecting pipe 30.

In the embodiment of such structured internal combustion engine, as with aforesaid explanation of the embodiment, the fuel, injected by the fuel injection valve 24, ignites and detonates in the cylinder body 10 in a compression process, water injection valve 26 injects water at a prearranged optimum timing linked to the camshaft of engine E.

Water jetted from water injection valve 46 flows from 30, and then enters water pipe injection valve 46 wherein is heated by the high temperature exhaust gas passing inside the exhaust manifold 22 and is jetted into the cylinder body 10 through nozzle 46a.

In the example in the FIG. 2, the cooling water sucked in by the sea water suction valve 36 passes through check valve 38b into cylinder head 16, wherein heat transfer takes place, then passing through the cooling water connecting pipe 44 is released thereoutside by the automatic switch 42, but by returning the water, heated to a sufficiently high temperature by the thermostat inserted in the automatic switch 42, to cylinder head 16 passing through check valve 38a, the water contained in the water injection valve 26, mounted to outer side of cylinder head 16, is maintained at a high temperature.

By this device, the water jetted from aforesaid water injection valve 26 is heated up to 70° to 80°, said water further heated by the heat energy from the exhaust gas in the exhaust manifold 22, whereafter, is jetted into cylinder body 10 timed to the completion of the fuel gas ignition and detonation process therein.

Therefore, the hot-water immediately vaporizes inside the cylinder body 10, pressing down the piston 12 with high pressure, and thereafter discharged through exhaust manifold 22.

In the embodimer. of .he internal combustion engine, as in the embodiment explained above, repetition of ignition and detonation of the fuel gas and injection of hot-water operations causes the vaporization of said hot-water to create a powerful expansion force which functions to make the power up of the internal combustion engine possible.

Furthermore, an earlier injection of higher temperature water than in the embodiment shown in FIG. 1 can be made, thereby producing a higher engine output.

Figure 6A:
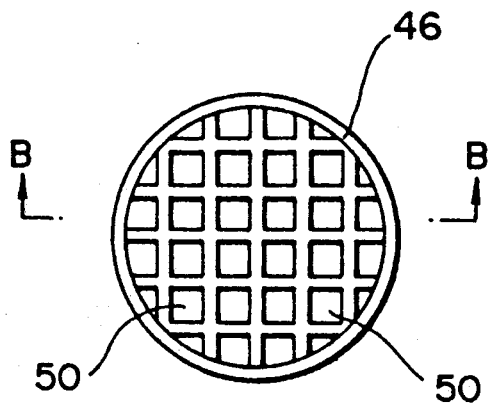
FIG. 6 (A) is a plan view showing one embodiment of the hot-water injection valve.
Figure 6B:
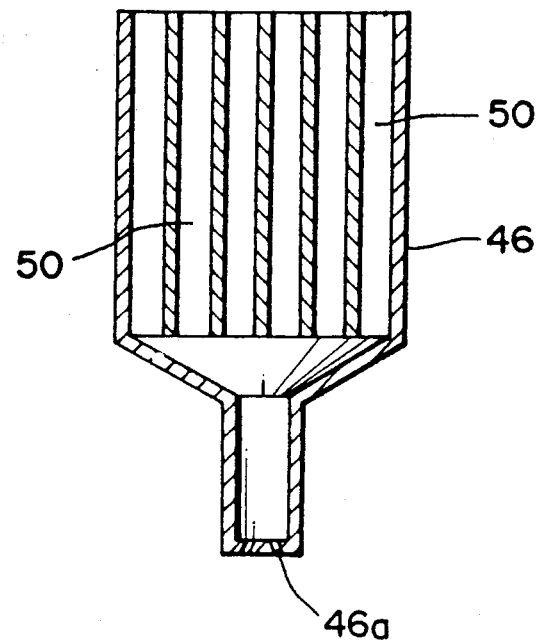

FIGS. 6 (A) and (B) indicate the modification of aforesaid hot-water injection valve 46 and nozzle 46a by forming a plurality of water passageways 50 inside said hot-water injection valve 46 further increasing the heating effect to the hot-water.

Figure 7A:
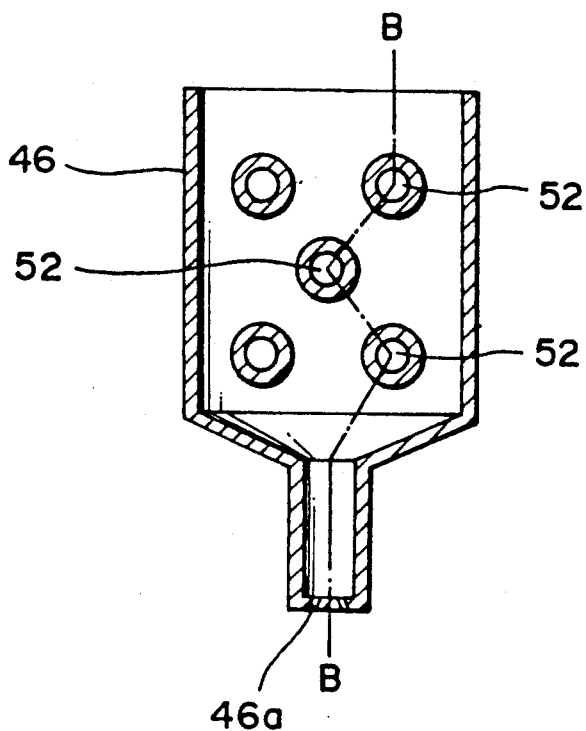
FIG. 7 (A) is a plan view showing another embodiment of hot water injection valve.
Figure 7B:
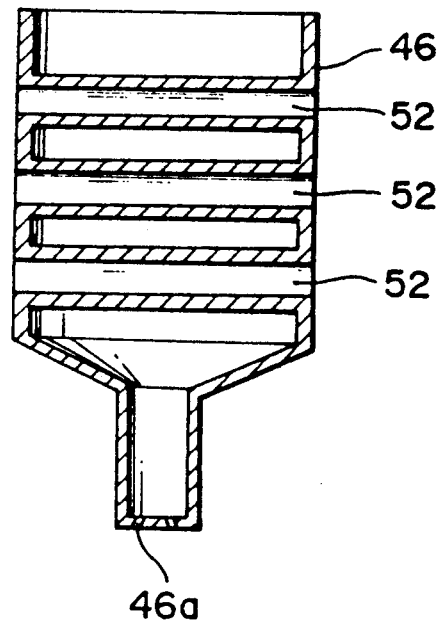

FIGS. 7 (A) and (B) are another modifications of aforementioned hot-water injection valve 46 and nozzle 46a, whereby a plurality of gas passageways 52 are formed inside said hot-water injection valve 46, and by allowing high temperature exhaust gas to pass through said gas passageway 52 the heat efficiency of the exhaust gas can be absorbed efficiently, thereby increasing the heating effect to the hot-water.

It should be appreciated that the present invention is not restricted to the abovementioned preferred embodiments thereof and various changes and modifications are possible within the intended spirit and scope of invention.

What is claimed is:

1. In an internal combustion engine, a combustion chamber defined by a cylinder, a piston capable of reciprocatingly moving in said cylinder, and a cylinder head including a fuel injection means and an exhaust means communicating with said combustion chamber, the improvement comprising:
water injection means for injecting a water jet into said combustion chamber timed to the completion of the fuel gas detonation process; and
said water injection means including a part having a structure capable of heat-transfer positioned in a part of said cylinder head of said exhaust means at a place where said exhaust means passes through said cylinder head.

2. In the internal combustion engine as set forth in claim 1, wherein said water injection means injects water at a prearranged optimum timing linked to an actuating mechanism of said fuel injection means for generating steam vapor immediately after a detonation in said combustion chamber.

3. In the internal combustion chamber as set forth in claim 1, wherein said water injection means includes an injection nozzle and plurality of passageways for hot water to flow therethrough. formed in the cylinder head at a prearranged optimum timing linked to the camshaft of said engine.

4. In an internal combustion engine having a combustion chamber defined by a cylinder, a piston capable of reciprocatingly moving in said cylinder, and a cylinder head including a fuel injection means and an exhaust means communicating with said combustion chamber, the improvement comprising:

water injection means for injecting a water jet into said combustion chamber timed to the completion of a fuel gas detonation process;

said water injection means including a part positioned in said exhaust means to heat-transfer from exhaust gas to the water flowing through said water injection means; and said water injection means being linked to an actuating mechanism of said fuel injection means for generating steam vapor immediately after a detonation in said combustion chamber for injecting the water jet into said combustion chamber at a prearranged optimum timing.

5. In the internal combustion engine as set forth in claim 4, wherein:

said water injection means includes means inserted from a top of said cylinder head through an exhaust passage into said combustion chamber and said water injection means includes a tip protruding into said combustion chamber; and said water injection includes an injection nozzle and a plurality of passageways in an interior portion of said injection nozzle for hot water to flow therethrough.

6. In the internal combustion engine as claimed in claim 1, wherein:

said water injection means includes means inserted from a top of said cylinder head through an exhaust passage into said combustion chamber.

7. In the internal combustion engine as claimed in claim 1, wherein said water injection means includes a tip protruding into said combustion chamber.

8. In the internal combustion engine as claim 6, wherein said water injection means includes a tip protruding into said combustion chamber.

9. The device of claim 2, wherein:

said water injection means (46) must be positioned to extend through the exhaust manifold (22).

10. The device of claim 2, wherein:

said water injection means (46) includes in the interior thereof a plurality of passageways (50) for hot-water liquids to flow therethrough.

11. In the internal combustion engine as set forth in claim 2, wherein said water injection means includes an injection nozzle and plurality of passageways for hot water to flow therethrough.

12. In the internal combustion engine as claimed in claim 5, wherein:

said water injection means includes means inserted from a top of said cylinder head through an exhaust passage into said combustion chamber.

13. In the internal combustion engine as claimed in claim 2, wherein said water injection means includes a tip protruding into said combustion chamber.

* * * * *